(12) United States Patent
Saez Anthonisen (10) Patent No.: US 11,971,012 B2
(45) Date of Patent: Apr. 30, 2024

(54) TOWER SECTION ARRANGEMENT FOR A GUYED TOWER OF A WIND TURBINE, GUYED WIND TURBINE TOWER, WIND TURBINE AND METHOD FOR ASSEMBLING A WIND TURBINE

(71) Applicant: Siemens Gamesa Renewable Energy Innovation & Technology S.L., Sarriguren (ES)

(72) Inventor: Aitor Saez Anthonisen, Bilbao (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 17/228,875

(22) Filed: Apr. 13, 2021

(65) Prior Publication Data
US 2021/0355916 A1    Nov. 18, 2021

(30) Foreign Application Priority Data
May 12, 2020   (EP) ..................................... 20382390

(51) Int. Cl.
*F03D 13/20*    (2016.01)

(52) U.S. Cl.
CPC .......... *F03D 13/22* (2016.05); *F05B 2230/61* (2013.01); *F05B 2240/912* (2013.01); *F05B 2260/301* (2013.01)

(58) Field of Classification Search
CPC ............... F03D 13/22; F05B 2240/912; F05B 2260/301
See application file for complete search history.

(56) References Cited

U.S. PATENT DOCUMENTS 2,410,245 A * 10/1946 William .................. E04H 12/20
                                                            403/338
2018/0003158 A1* 1/2018 Pedersen ............... E04H 12/342
(Continued)

FOREIGN PATENT DOCUMENTS

| CN | 202132187 U | 2/2012 |
|---|---|---|
| CN | 210049990 U | 2/2020 |
| WO | WO 2016116107 A1 | 7/2016 |

(Continued)

OTHER PUBLICATIONS

English Translation of CN 210049990 U. (Year: 2020).*
(Continued)

*Primary Examiner* — Sean Gugger
(74) *Attorney, Agent, or Firm* — Schmeiser, Olsen & Watts LLP (57) ABSTRACT

Provided is a tower section arrangement for a guyed tower of a wind turbine, the tower section arrangement including: a tower section including a wall having an outer surface with a circumference, at least two brackets attached to the outer surface of the wall at different locations on its circumference, and at least two stay cables, wherein each stay cable is connected at its first end to one of the brackets and is configured for connection at its second end to a cable foundation, and wherein an angle (α) between each stay cable and a tangent to the outer circumference at the respective bracket has, in a top view of the erected wind turbine, a value of 90° when the respective stay cable is guyed.

15 Claims, 10 Drawing Sheets

(56) References Cited

U.S. PATENT DOCUMENTS

2021/0246002 A1* 8/2021 Mayfield .............. E04H 12/345
2021/0277866 A1* 9/2021 Baun ...................... F03D 13/20

FOREIGN PATENT DOCUMENTS

WO     WO 2017041806 A1    3/2017
WO     WO 2018233784 A1    12/2018

OTHER PUBLICATIONS

Teichmann Fred: "Engineer Training Series—Guyed Towers", Apr. 30, 2014, XP055604229, Retrieved from the Internet: URL:https://www.slideshare.net/FredTeichman/part-3-guy-tower-structure [retrieved on Jul. 10, 2019].
European Search Report dated Oct. 26, 2020 for application No. 20382390.1.

* cited by examiner

TOWER SECTION ARRANGEMENT FOR A GUYED TOWER OF A WIND TURBINE, GUYED WIND TURBINE TOWER, WIND TURBINE AND METHOD FOR ASSEMBLING A WIND TURBINE

CROSS-REFERENCE TO RELATED APPLICATIONS

This application claims priority to European Application No. 20382390.1, having a filing date of May 12, 2020, the entire contents of which are hereby incorporated by reference.

FIELD OF TECHNOLOGY

The following relates to a tower section arrangement for a guyed tower of a wind turbine, a guyed wind turbine tower, a wind turbine and a method for assembling a wind turbine.

BACKGROUND

The energy production of a wind turbine at a given site increases with the height of the rotor hub and, thus, with the height of the tower. However, when increasing the tower height structural requirements of the tower are one of the challenging and limiting factors.

Wind turbine towers are subject to various loads such as static loads from the weight of the nacelle and the tower itself, and dynamic loads for example arising from the rotor thrust and from spatially uneven and temporally unsteady oncoming wind. Further, wind turbine towers being tall thin structures are generally susceptible to vibrations. Therefore, resonance induced-loads due to excitations near the eigenfrequency of the tower can play an important role.

Increasing the height of a wind turbine tower requires increasing its structural strength and rigidity. Increasing the diameter of the tower and/or the thickness of its wall is limited by transportation and cost issues.

Alternatively, the structural strength and rigidity of a wind turbine tower can be increased by designing it as a guyed tower using stay cables. The stay cables are conventionally anchored at the inner surface of the wind turbine tower wall. However, internal attachment means occupy space inside the tower which might be required for other elements, such as a ladder, an elevator, electrical cables and platforms. Further, an extra platform is required to access the internal attachment means.

SUMMARY

An aspect relates to an improved tower section arrangement for a guyed tower of a wind turbine. Furthermore, it is an aspect of embodiments of the present invention to provide an improved guyed wind turbine tower and an improved wind turbine. A further aspect of embodiments of the present invention is to provide an improved method for assembling a wind turbine.

According to a first aspect, a tower section arrangement for a guyed tower of a wind turbine is provided. The tower section arrangement comprises:
a tower section including a wall having an outer surface with a circumference,
at least two brackets attached to the outer surface of the wall at different locations on its circumference, and
at least two stay cables,
wherein each stay cable is connected at its first end to one of the brackets and is configured for connection at its second end to a cable foundation, and
wherein an angle between each stay cable and a tangent to the outer circumference at the respective bracket has, in a top view of the erected wind turbine, a value of 90° when the respective stay cable is guyed.

Having the stay cables connected to brackets attached at the outer surface of the tower section wall allows an easier anchoring of the stay cables at the tower. For example, it allows connecting the stay cables to the tower section from the outside of the tower. Thus, no additional platform inside the tower is required for attaching the stay cables from the inside. For example, it allows connecting the brackets and/or the stay cables prior to lifting the tower section up during installation of the wind turbine. Furthermore, the connection means do not occupy space inside the tower which is needed for other equipment.

By arranging the stay cables such that the angle between each stay cable and the tangent to the outer circumference at the respective bracket has, in a top view of the erected wind turbine, a value of 90°, fewer stay cables are required to support the tower. For example, three stay cables could be sufficient to provide the required structural strength of the tower. Having less stay cables, the area around the tower is less crowded allowing an easier access to the tower and easier maintenance of the tower.

A wind turbine is an apparatus to convert the wind's kinetic energy into electrical energy. The wind turbine comprises, for example, a rotor having one or more blades, a nacelle comprising a generator and a tower holding, at its top end, the nacelle. The tower of the wind turbine is connected to a foundation of the wind turbine. The wind turbine is, for example, an onshore wind turbine.

The tower has, for example a height of 120-180 meter or more. The tower is, in particular, a guyed wind turbine tower comprising the stay cables. The stay cables support the structural rigidity and stiffness of the tower. Thus, the stay cables ensure the stability of the tower with respect to fatigue loads and extreme loads. In particular, the stay cables ensure the stability of the tower with respect to dynamic events caused by wind.

The tower comprises, for example, several tower sections bolted to each other at tower section flanges. The tower section at which the stay cables are anchored by the brackets is, for example, a tower section of an upper half of the tower. The tower section at which the stay cables are anchored by the brackets is, for example, a short tower section which can be transported vertically. Its height is, for example, smaller than its diameter. It has, for example, a height of 1.5-3 meters. However, it may also have a different height. The stay cables may, for example, be attached to the tower section when the tower section is vertically standing on the ground, e.g., at the erection site.

The wall of the tower section is, in particular, an outer wall of the tower section.

The at least two brackets are attached to the outer surface of the wall at different locations on its circumference. The different locations are, in particular, spaced apart from each other on the circumference in even intervals. Thus, the at least two stay cables connected to the brackets are, in particular, arranged evenly spaced around the tower section and the tower. This is advantageous as stay cables provide only tensile force but no compression force.

The stay cables are structural members with high resistance to tensile stresses. The stay cables are made for example, from metal, in particular steel, e.g., high strength steel.

Each stay cables includes, for example, one or more strands of stranded wires. Each stay cable includes, for example, a cable core. Each stay cable includes, for example, a coating.

An angle of 90° between each stay cable and a tangent to the outer circumference at the respective bracket is to be understood as an angle of approximately 90°. That means it includes values around 90°, for example values in the range of exactly 80° to exactly 100°, exactly 85° to exactly 95° and/or exactly 88° to exactly 92°.

The cable foundations are made, for example, from concrete. They are, for example, buried in the ground. The stay cables are, for example, connected to the cable foundations by connecting means, the connecting means being partly embedded in concrete.

According to an embodiment, the at least two brackets are attached to the outer surface of the wall by bolts.

Thus, the brackets for the stay cables can be easily attached to the outer wall surface of the tower section. The brackets may, for example, be attached by bolts to the tower wall of the tower section after transporting the tower section to an erection site of the wind turbine. This allows an easier transportation of the tower section as the tower section without the brackets has a smaller diameter than the tower section with the brackets. For example, each bracket extends by about 0.5-1 meter from the tower section wall. In this example, the tower section without the brackets would be by about 1-2 meters smaller than the tower section with the brackets attached.

Further, there exist restricting regulations with respect to the width/diameter of objects transported overland in some countries. Such restricting regulations may, for example, require that the diameter of a transported object is smaller than 4.5 meters. However, with the brackets attached, the tower section for a large wind turbine tower may likely have a diameter exceeding 4.5 meters. Thus, attaching the brackets after transportation of the tower section can make an overland transportation of the tower section possible also in countries which have such regulations.

The brackets include, in particular several through holes for receiving the bolts.

According to a further embodiment, the tower section arrangement comprises attachment means welded to the outer surface of the wall, wherein the at least two brackets are bolted to the attachment means.

The attachment means welded to the outer surface include, for example, small vertical, circumferential and/or partly circumferential plates with through holes to receive the bolts. The attachment means may, for example, include a ring embracing the outer circumference of the tower section.

Having the attachment means allows an even easier attachment of the brackets.

According to a further embodiment, the tower section wall includes wall through holes, and the at least two brackets are bolted to the outer surface of the wall by bolts inserted through the wall through holes.

Thus, the brackets can be directly bolted to the wall of the tower section. The brackets can, for example, be bolted to the tower section when the tower section is still on the ground. The bolts are, for example, secured with nuts.

According to a further embodiment, the at least two brackets are welded to the outer surface of the wall.

This provides an alternative attachment with respect to bolts. It may, for example, be applied in cases in which the transportation of a large diameter tower section is less problematic. This may, for example, be the case when the tower section is transported by ship to an erection site that is close to the sea shore, or when the tower section is transported overland in a country with less severe restrictions with respect to the size of a transported object.

According to a further embodiment, each of the at least two brackets comprises a plate-like structure. Each of the plate-like structures is arranged, in a top view of the erected wind turbine, at an angle of 90° with respect to the tangent to the outer circumference at the respective plate-like structure. Further, each of the plate-like structures comprises a bracket through hole in a direction parallel to the tangent. Furthermore, each of the bracket through holes is configured for connection with the first end of the respective stay cable.

Having the plate-like structures orientated at the same angle as the stay cables allows a better load transmission from the tower to the stay cables.

Each of the plate-like structures is, in particular, arranged, in a top view of the vertical tower section, at an angle of 90° with respect to the tangent to the outer circumference at the respective plate-like structure.

According to a further embodiment, each of the at least two stay cables is connected at its first end with a clevis having two clevis through holes. Each clevis is arranged such that its two clevis through holes and the respective bracket through hole are aligned with each other. In addition, each of the at least two stay cables is connected to one of the brackets by a pin being inserted through the respective two clevis through holes and the respective bracket through hole.

Having each stay cable connected to the respective bracket by a clevis and a pin allows rotation of the stay cable around an axis defined by the pin before connecting the respective stay cable to its cable foundation. In other words, it allows rotation around an axis parallel to the tangent to the outer circumference of the tower section wall at the respective bracket. Therefore, it is possible to correct small angle deviations prior to connecting a stay cable to its cable foundation. Thus, there is a greater construction tolerance with respect to the relative arrangement of the tower, brackets and cable foundations. Further, the clevis-and-pin connection restricts rotation of the stay cable in other directions.

According to a further embodiment, the tower section comprises one or more reinforcement elements at an inner surface of the tower section wall and opposite the at least two brackets attached at the outer surface of the tower section wall.

Thus, the tower section wall is reinforced in a region where the tensile force of the stay cables affects the tower section wall.

According to a further embodiment, the tower section arrangement comprises:
three stay cables, and
three brackets attached to the outer surface of the tower section wall and arranged at intervals corresponding to angels of 120° along its circumference.

The tower section arrangement may also comprise, for example, four stay cables and four brackets, wherein the four brackets are attached to the outer surface of the wall and arranged at intervals of 90° along its circumference.

According to a second aspect, a wind turbine tower is provided. The wind turbine tower is configured for being guyed by stay cables. Further, the tower comprises a tower section arrangement as described above.

According to a third aspect, a wind turbine is provided. The wind turbine comprises a guyed tower as described above, and at least two cable foundations. Furthermore, each of at least two stay cables of a tower section arrangement of the tower is connected at its first end to a bracket of a tower section of the tower section arrangement, and is connected at its second end to one of the cable foundations. In addition, each of the at least two stay cables is guyed between the respective bracket and the respective cable foundation. Furthermore, an angle between each stay cable and a tangent to an outer circumference of a tower section wall at the respective bracket has, in a top view of the erected wind turbine, a value of 90°.

According to a fourth aspect, a method for assembling a wind turbine is proposed. The method comprises the steps of:
a) providing a tower section, the tower section including a at least two brackets attached to an outer surface of a tower section wall and at different locations on its circumference,
b) connecting at least two stay cables to the at least two brackets, and
c) lifting the tower section with the attached stay cables onto a further already erected tower section.

Thus, the stay cables are attached to the tower section via the brackets before lifting the tower section up to connect the tower section with a further already erected tower section. Thus, the stay cables can be easier connected to the tower section. The stay cables may, for example, be attached to the brackets of the tower section at an erection site of the wind turbine. The stay cables may, for example, be attached to the brackets when the tower section is in a vertical position on the ground.

According to an embodiment of the fourth aspect, the method includes, before step a), the step of attaching the at least two brackets to the tower section at an erection site of the wind turbine.

Thus, the tower section can be transported to the erection site without the brackets.

According to a further embodiment of the fourth aspect, the method includes, after step c), the step of connecting each of the at least two stay cables to a cable foundation.

According to a further embodiment of the fourth aspect, the method includes, the step of tensioning the at least two stay cables.

The embodiments and features described with reference to the tower section arrangement of the present invention apply mutatis mutandis to the tower, the wind turbine and the method of embodiments of the present invention and vice versa.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein.

DETAILED DESCRIPTION

Figure 1:
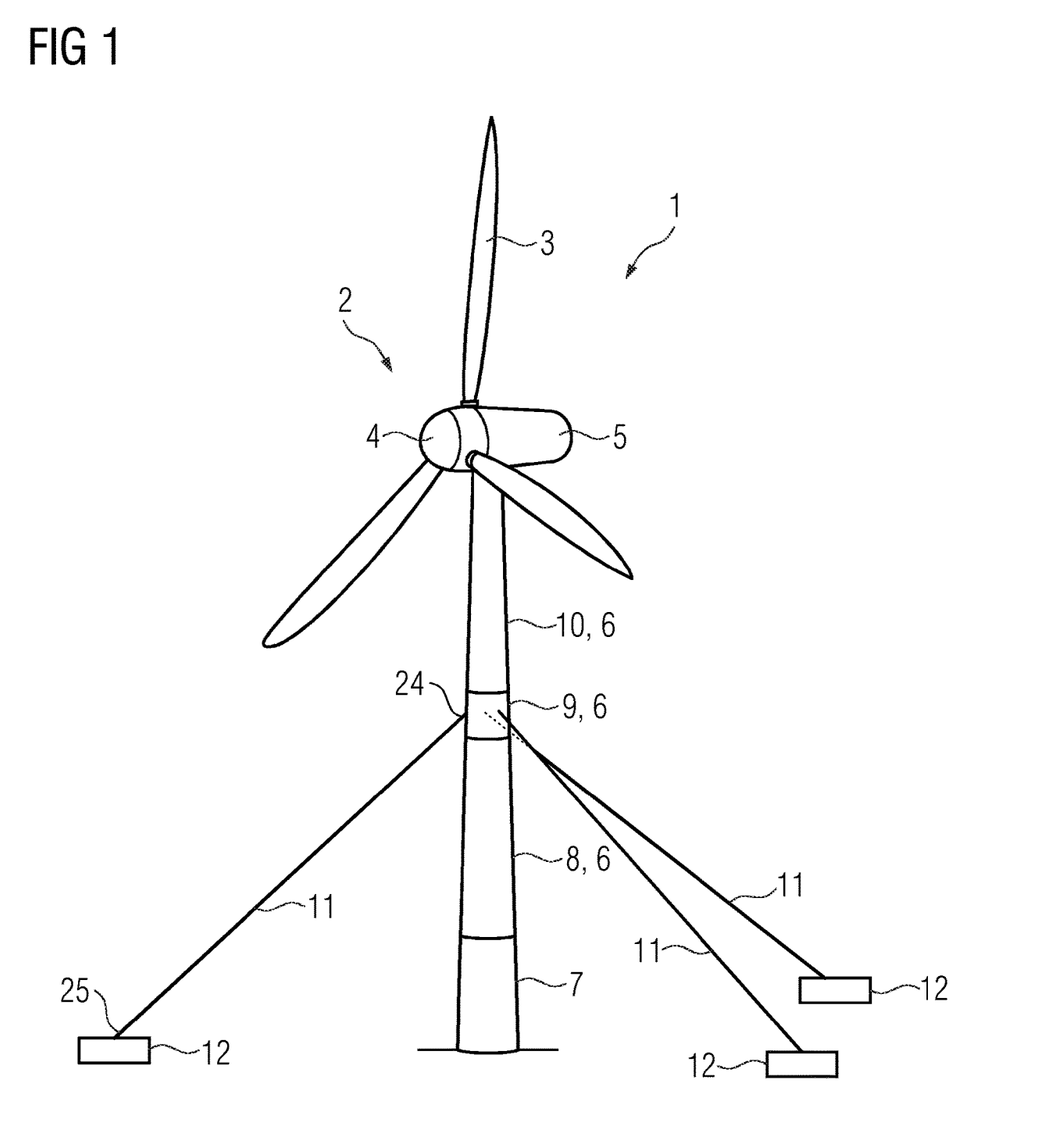
FIG. 1 shows a wind turbine according to an embodiment.

FIG. 1 shows a wind turbine 1 according to an embodiment.

The wind turbine 1 comprises a rotor 2 having, for example, three rotor blades 3. The rotor blades 3 are connected to a hub 4 of the wind turbine 1. The rotor 2 is connected to a generator (not shown) arranged inside a nacelle 5. The nacelle 5 is arranged at the upper end of a tower 6 of the wind turbine 1. The nacelle 5 is connected to the tower 6, for example by a yaw bearing (not shown) such that the nacelle 5 can rotate relative to the tower 6. The tower 6 is, for example, erected on a monopile 7 driven into the ground. The wind turbine 1 is, in particular, an onshore wind turbine.

The wind turbine 1 converts the wind's kinetic energy into electrical energy. The higher the hub 4, i.e. the higher the tower 6, the more electrical energy can be generated with a wind turbine at a given wind harvesting site.

The tower 6 has, for example, a height of 120-180 meters. The tower 6 comprises, for example, several tower sections such as the tower sections 8, 9, 10 shown schematically in FIG. 1. The tower 6 is a guyed tower comprising stay cables 11. Each stay cable 11 is tethered between the tower section 9 and a respective cable foundation 12. The cable foundations 12 include, for example, concrete blocks buried in the ground.

The stay cables 11 are connected to the tower section 9 as described in the following.

Figure 2:
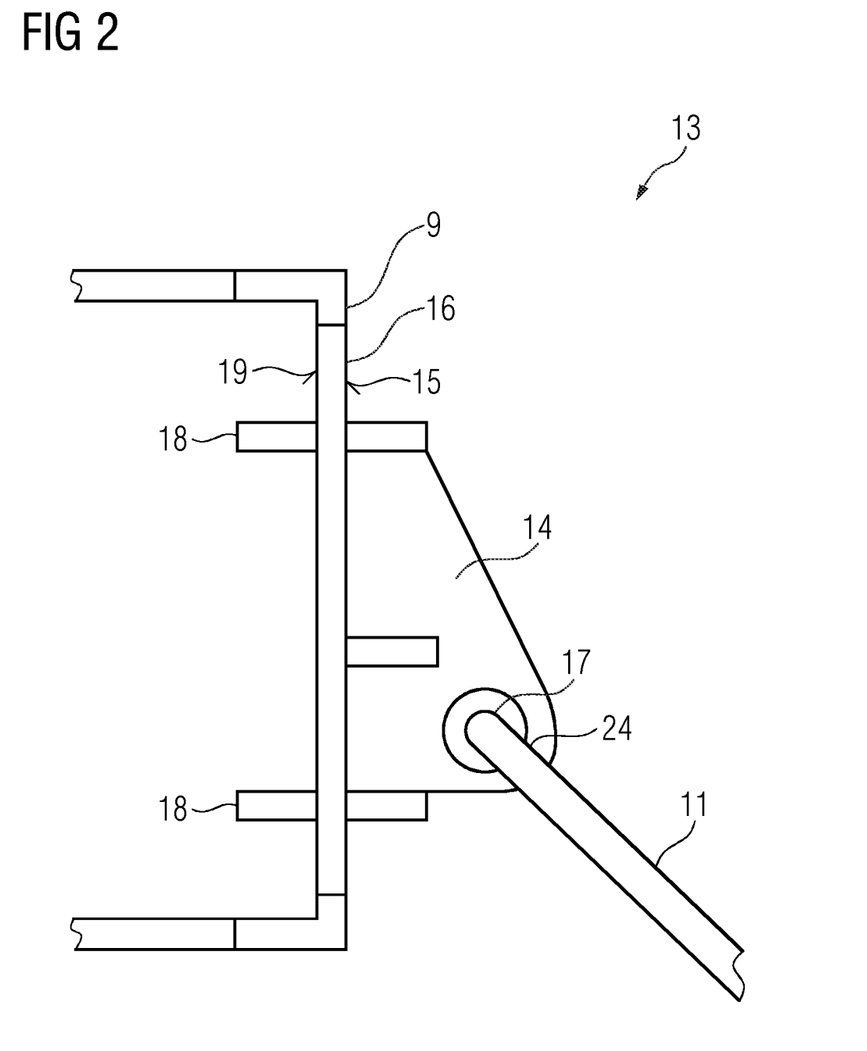
FIG. 2 shows a partial cross-section view of a tower section arrangement of the wind turbine of FIG. 1 according to a first embodiment.

FIG. 2 shows a first embodiment of a tower section arrangement 13. The tower section arrangement 13 comprises the tower section 9, the stay cables 11 and brackets 14. The tower section arrangement 13 comprises, for example, three stay cables 11 and three brackets 14.

The brackets 14 of the first embodiment are welded to an outer surface 15 of a wall 16 of the tower section 9. Each bracket 14 comprises a bracket through hole 17 for connection with a respective stay cable 11.

The tower section 9 further comprises reinforcement elements 18 such as reinforcement circumferential rings at an inner surface 19 of the tower section wall 16.

Figure 3:
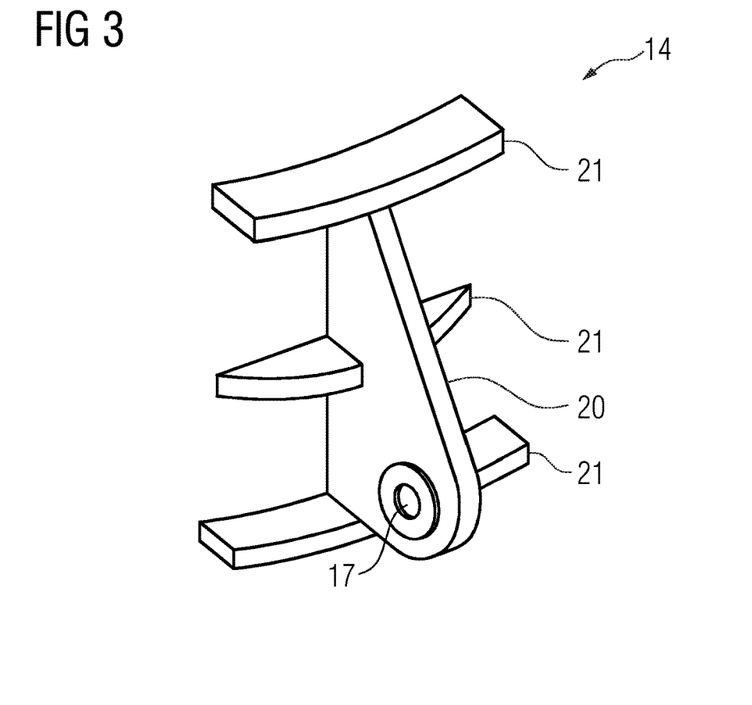
FIG. 3 shows a perspective view of a bracket of the tower section arrangement of FIG. 2.

FIG. 3 shows a perspective view of one of the brackets 14 of the first embodiment. The bracket 14 includes a plate-like structure 20 and several cross members 21. The plate-like structure 20 comprises the bracket through hole 17.

Figure 4:
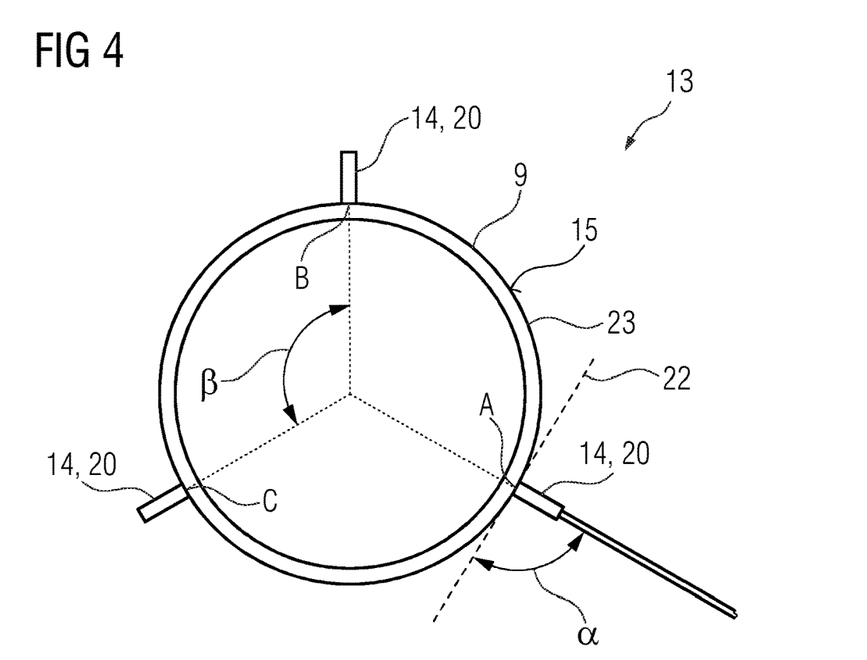
FIG. 4 shows a schematic top view of the tower section arrangement of FIG. 2.

As shown schematically in FIG. 4, the plate-like structure 20 of each bracket 14 is arranged, in a top view of the vertical tower section 9 (i.e. in a top view of the erected wind turbine 1), at an angle α of 90° with respect to a tangent 22 to the outer circumference 23 at the respective plate-like structure 20. Further, each of the bracket through holes 17 (FIG. 2) is arranged in a direction parallel to the tangent 22 (FIG. 4).

In the example of FIG. 4, the tower section arrangement 13 comprises three brackets 14 attached to the outer surface 15 at different locations A, B, C on its circumference 23. In particular, the brackets 14 are arranged at even intervals corresponding to angles β of 120° along its circumference 23.

The cross members 21 of each bracket 14 (FIG. 3) are formed such that they adapt to the curvature of the outer circumference 23 of the tower section wall 16 (FIG. 4).

Each stay cable 11 is connected at its first end 24 to one of the brackets 14 (FIGS. 1, 2), and is connected at its second end 25 to one of the cable foundations 12 (FIG. 1).

Figure 5:
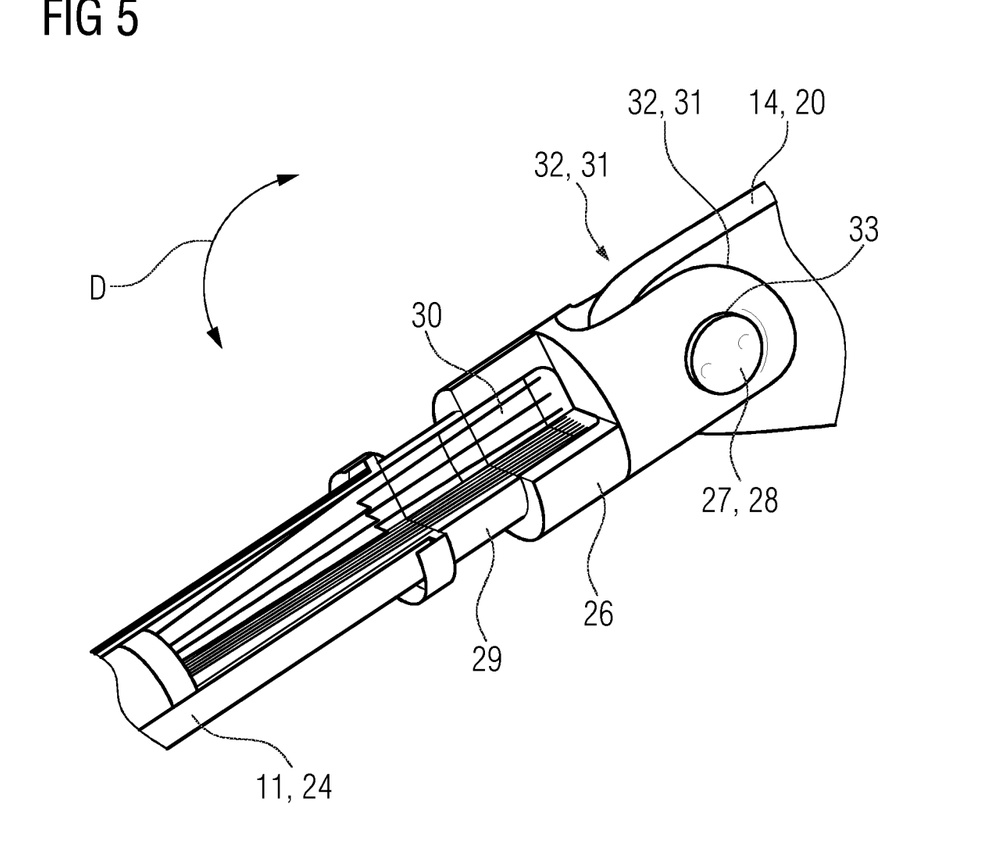
FIG. 5 shows a perspective view of a clevis-and-pin connection of a stay cable and a bracket of the tower section arrangement of FIG. 2.

As shown in FIG. 5, each stay cable 11 is connected at its first end 24 to the respective bracket 14, for example, by a clevis 26 and a pin 27 and pin retainer 28. The clevis 26 is fixed to the first end 24 of the stay cable 11 by a flange tube 29 and an anchor block 30. The clevis 26 has a U-shaped portion 31 comprising two legs 32. Each leg 32 comprises a through hole 33 (in FIG. 5 only one of the two through holes 33 is visible).

Each clevis 26 is arranged such that its two clevis through holes 33 and the respective bracket through hole 17 (FIG. 2) are aligned with each other. Further, the pin 27 is inserted through the aligned two clevis through holes 33 and the bracket through hole 17 (FIG. 5). The pin 27 is secured with the pin retainer 28. The connection of the stay cable 11 and the bracket 14 by the clevis 26 and the pin 27 allows rotation of the stay cable 11 in a direction D (FIG. 5) before the stay cable 11 is fixed at its other end 25 to the cable foundation 12 (FIG. 1).

Figure 6:
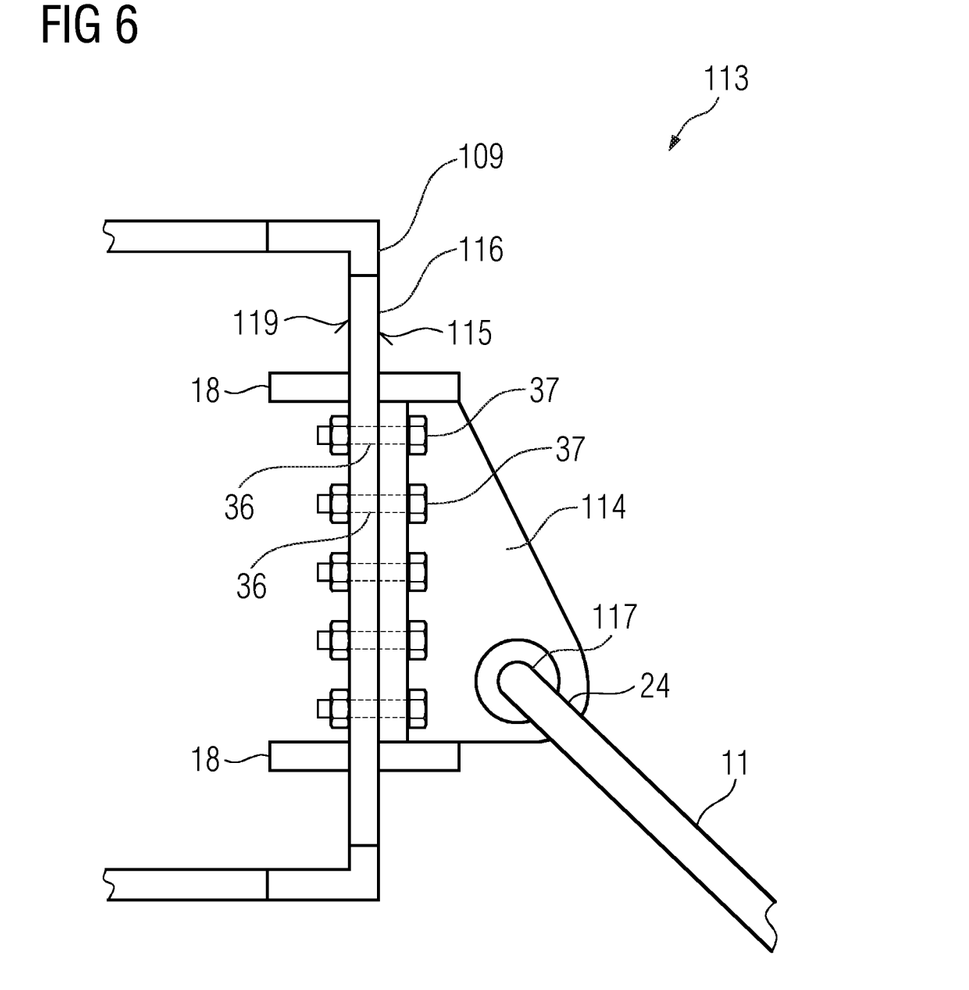
FIG. 6 shows a partial cross-section view of a tower section arrangement of the wind turbine of FIG. 1 according to a second embodiment.

FIG. 6 shows a second embodiment of a tower section arrangement 113. The tower section arrangement 113 comprises a tower section 109, stay cables 11 and brackets 114. The tower section arrangement 113 comprises, for example, three stay cables 11 and three brackets 114.

The brackets 114 of the second embodiment are bolted to an outer surface 115 of a wall 116 of the tower section 109. Each bracket 114 comprises a bracket through hole 117 for connection with a respective stay cable 11. The stay cables 11 are, for example, connected to the through hole 117 by a clevis-and-pin system similar as shown in FIG. 5.

The tower section 109 may further comprise reinforcement elements 118 at an inner surface 119 of the tower section wall 116 similar to the reinforcement elements 18 according to the first embodiment.

Figure 7:
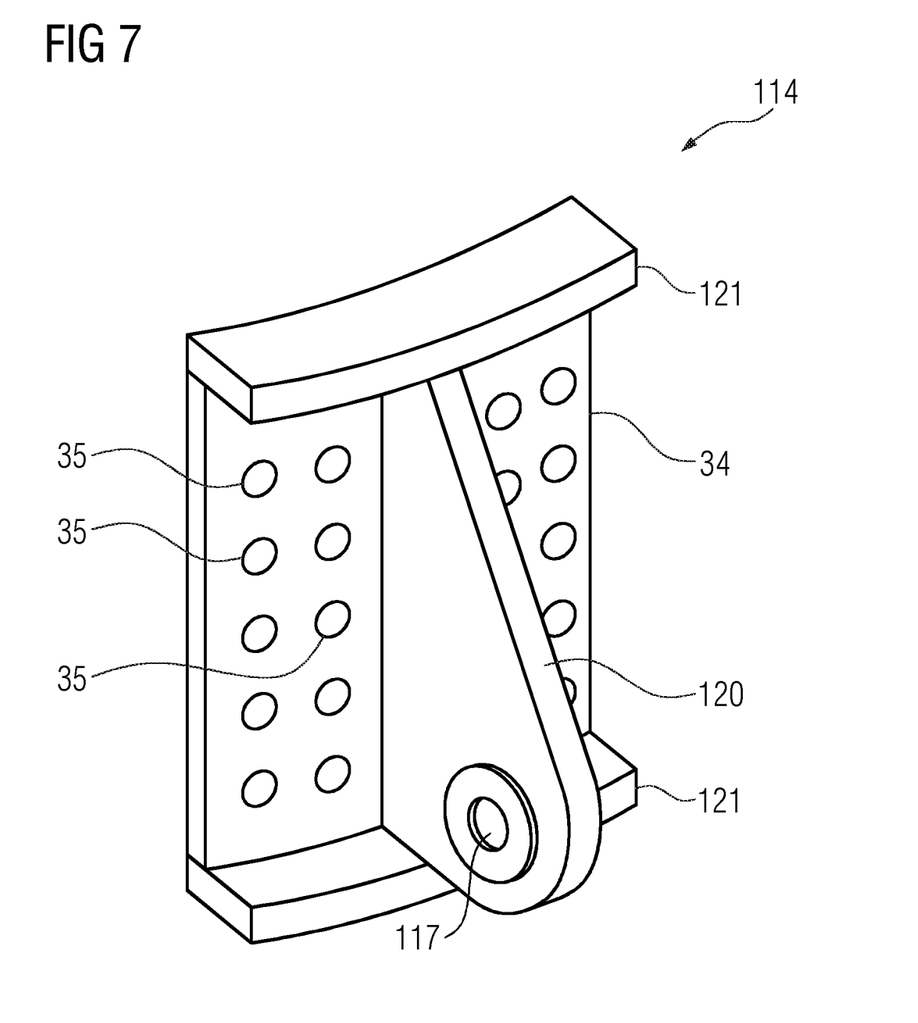
FIG. 7 shows a perspective view of a bracket of the tower section arrangement of FIG. 6.

FIG. 7 shows a perspective view of one of the brackets 114 of the second embodiment. Each bracket 114 includes a plate-like structure 120 having the bracket through hole 117. The bracket 114 further includes several cross members 121 and a back plate 34.

The plate-like structure 120 of the second embodiment is arranged similar as the plate-like structure 20 of the first embodiment with respect to the angle α of 90° relative to the tangent 22, as shown in FIG. 4.

The back plate 34 comprises several thorough holes 35 (FIG. 7) for a bolt connection with the wall 116 of the tower section 109 (FIG. 6). Some of the through holes 35 of the back plate 34 are denoted with a reference sign in FIG. 7. Further, the tower section wall 116 comprises several wall through holes 36. The bracket 114 is bolted to the wall 116 by bolts 37 inserted in the respective through holes 35 of the bracket 114 and the wall through holes 36 of the wall 116.

Figure 8:
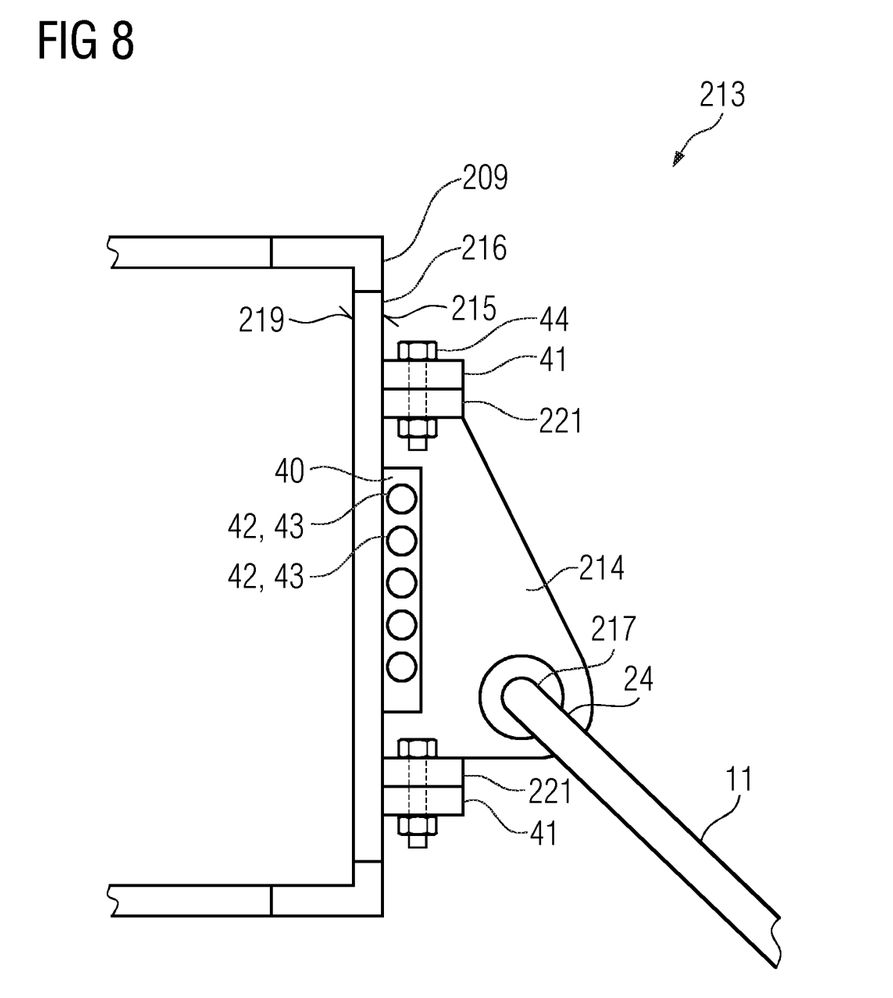
FIG. 8 shows a partial cross-section view of a tower section arrangement of the wind turbine of FIG. 1 according to a third embodiment.

FIG. 8 shows a third embodiment of a tower section arrangement 213. The tower section arrangement 213 comprises a tower section 209, stay cables 11 and brackets 214. The tower section arrangement 213 comprises, for example, three stay cables 11 and three brackets 214.

The brackets 214 of the third embodiment are bolted to an outer surface 215 of a wall 216 of the tower section 209. Each bracket 214 comprises a bracket through hole 217 for connection with a respective stay cable 11. The stay cables 11 are, for example, connected to the through hole 217 by a clevis-and-pin system similar as shown in FIG. 5.

The tower section 209 may further comprise reinforcement elements (not shown) at an inner surface 219 of the tower section wall 216 similar to the reinforcement elements 18 according to the first embodiment.

Figure 9:
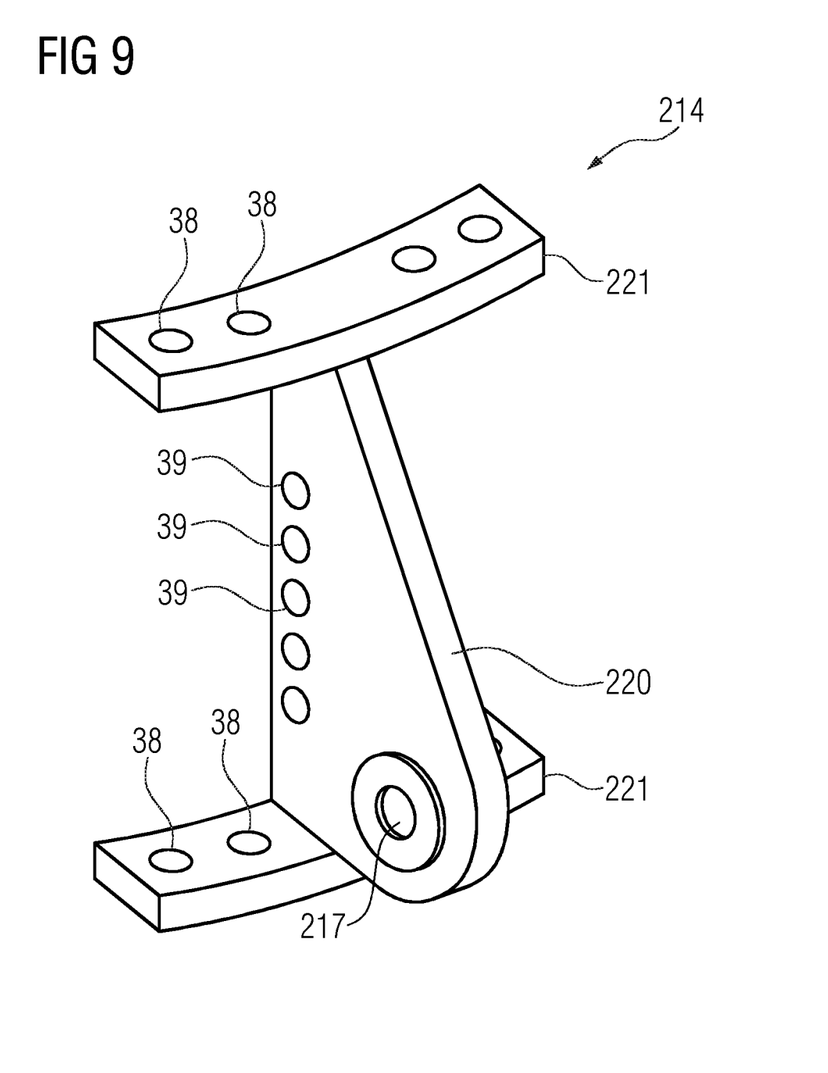
FIG. 9 shows a perspective view of a bracket of the tower section arrangement of FIG. 8.

FIG. 9 shows a perspective view of one of the brackets 214 of the third embodiment. Each bracket 214 includes a plate-like structure 220 having the bracket through hole 217. The plate-like structure 220 of the third embodiment is arranged similar as the plate-like structure 20 of the first embodiment with respect to the angle α of 90° relative to the tangent 22, as shown in FIG. 4.

The bracket 214 further includes several cross members 221 having through holes 38. Furthermore, the plate-like structure 220 also includes several through holes 39. Some of the through holes 38 and 39 are denoted with a reference sign in FIG. 9. The through holes 38 and 39 are configured for a bolt connection with attachment means 40, 41 welded to the wall 216 of the tower section 209 (FIG. 8).

The attachment means 40 include, for example, one or more vertical plates with through holes 42. The attachment means 40 are bolted to the plate-like structure 220 of the bracket 214 by bolts 43 inserted in the through holes 42 and 39. The attachment means 41 include, for example, one or more circumferential rings or partial circumferential rings. The attachment means 41 are bolted by bolts 44 to the cross members 221 (FIG. 9).

In the following, a method for assembling the wind turbine 1 of FIG. 1 is described with reference to FIGS. 10 and 11.

Figure 10:
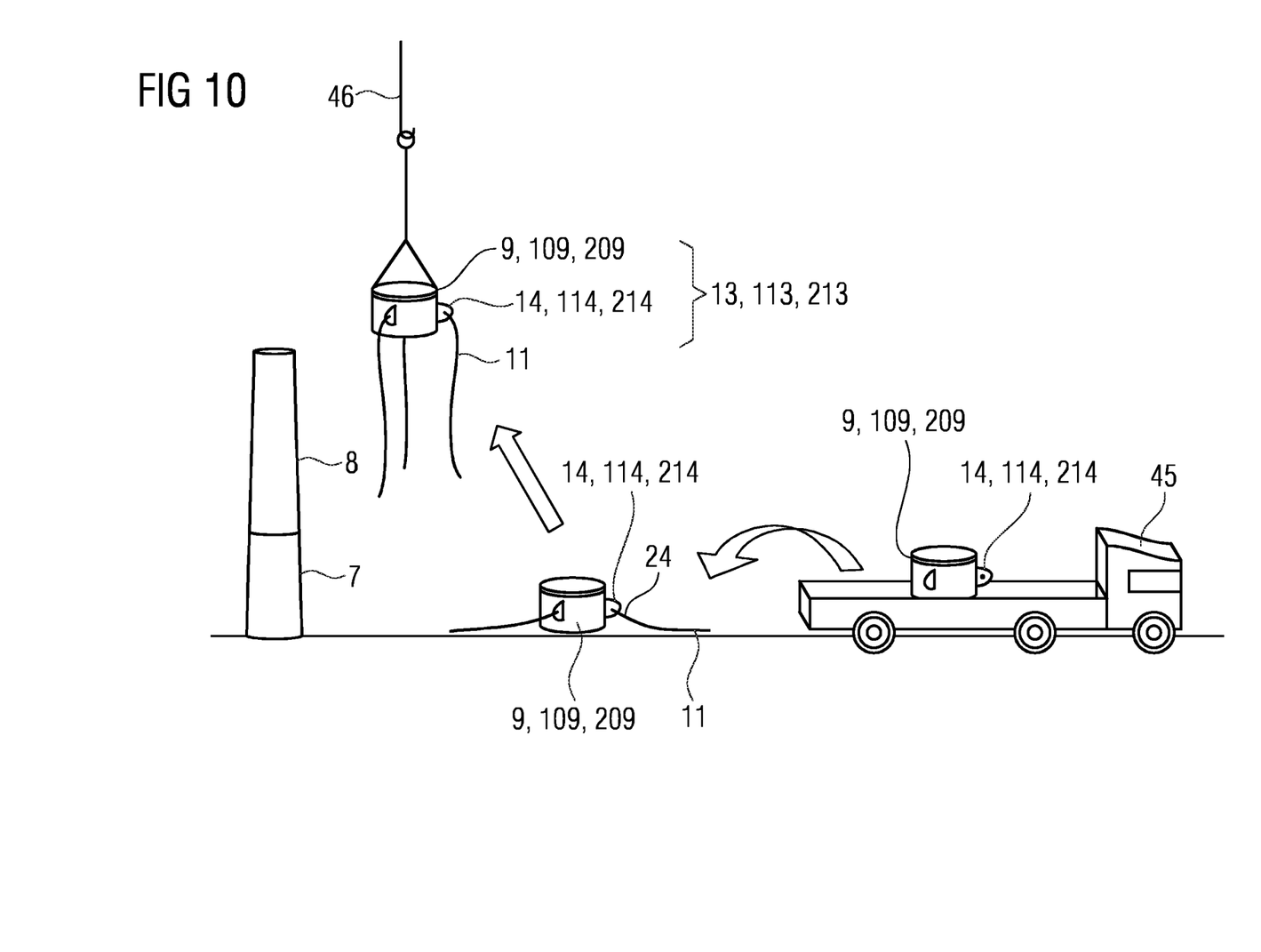
FIG. 10 illustrates a method for assembling the wind turbine of FIG. 1.
Figure 11:
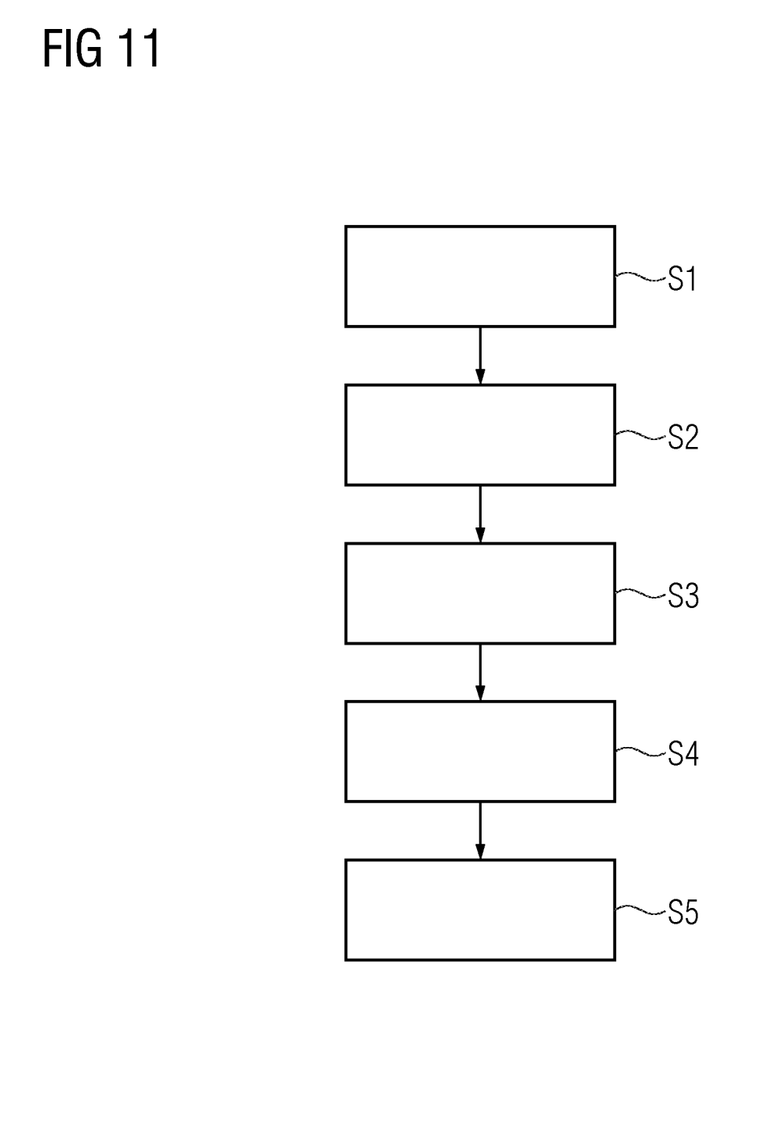
FIG. 11 shows a flowchart illustrating the method for assembling the wind turbine of FIG. 1.

In step S1 of the method, the tower section 9, 109, 209 is transported by a vehicle 45 to an erection site of the wind turbine 1, as shown in FIG. 10. In this example, the tower section 9, 109, 209 already comprises the brackets 14, 114, 214 prior to transportation. Alternatively, the tower section 9, 109, 209 might be transported without the brackets 14, 114, 214 to the erection site. In this case, the brackets 14, 114, 214 are attached to the tower section 9, 109, 209 at the erection site.

In step S2 of the method, the stay cables 11 are connected at their first end 24 to the brackets 14, 114, 214 when the tower section 9, 109, 209 is in a vertical position, as shown in FIG. 10.

In step S3 of the method, the tower section arrangement 13, 113, 213 (i.e. the tower section 9, 109, 209, the brackets 14, 114, 214 and the stay cables 11) is lifted by a crane 46 onto a further already erected tower section 8.

In step S4 of the method, each of the stay cables 11 is connected to a cable foundation 12 (FIG. 1).

In step S5 of the method, each of the stay cables 11 is tensioned between the respective bracket 14, 114, 214 and cable foundation 12.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A tower section arrangement for a guyed tower of a wind turbine, the tower section arrangement comprising:
   a tower section including a wall comprising an outer surface with a circumference;
   at least two brackets attached to the outer surface of the wall at different locations on the circumference, wherein each of the at least two brackets comprises a single plate structure extending vertically between a first cross member and a second cross-member, the first cross member and the second cross-member being physically connected to the single plate structure and extending laterally from the single plate structure to adapt to a curvature of the tower section;
   at least two stay cables;
   wherein each stay cable is connected at a first end to one of the at least two brackets and is configured for connection at a second end to a cable foundation;
   wherein an angle (a) between each stay cable and a tangent to the circumference at the respective bracket has, in a top view of the erected wind turbine, a value of 90° when the respective stay cable is guyed.

2. The tower section arrangement according to claim 1, wherein the at least two brackets are attached to the outer surface of the wall by bolts.

3. The tower section arrangement according to claim 2, comprising attachment means welded to the outer surface of the wall, wherein the at least two brackets are bolted to the attachment means.

4. The tower section arrangement according to claim 2, wherein the wall includes wall through holes, and the at least two brackets are bolted to the outer surface of the wall by bolts inserted through the wall through holes.

5. The tower section arrangement according to claim 1, wherein the at least two brackets are welded to the outer surface of the wall.

6. The tower section arrangement according to claim 1, wherein:
   each of the single plate structures is arranged, in a top view of the erected wind turbine, at an angle ($\alpha$) of 90° with respect to a tangent to the circumference at the respective plate-like structure,
   each of the single plate structures comprises a bracket through hole in a direction parallel to the tangent; and
   each of the bracket through holes is configured for connection with the first end of the respective stay cable.

7. The tower section arrangement according to claim 6, wherein:
   each of the at least two stay cables is connected at the first end with a clevis comprising two clevis through holes,
   each clevis is arranged such that the two clevis through holes and the respective bracket through hole are aligned with each other; and
   each of the at least two stay cables is connected to one of the brackets by a pin being inserted through the respective two clevis through holes and the respective bracket through hole.

8. The tower section arrangement according to claim 1, wherein the tower section comprises one or more reinforcement elements at an inner surface of the wall and opposite the at least two brackets attached at the outer surface of the wall.

9. The tower section arrangement according to claim 1, comprising:
   three stay cables; and
   three brackets attached to the outer surface of the wall and arranged at intervals corresponding to angles ($\beta$) of 120° along the circumference.

10. A wind turbine tower configured for being guyed by stay cables, the tower comprising the tower section arrangement according to claim 1.

11. A wind turbine, comprising:
    the wind turbine tower according to claim 10; and
    at least two cable foundations;
    wherein each of at least two stay cables of the tower section arrangement of the tower is connected at the first end to a bracket of the tower section of the tower section arrangement, and is connected at the second end to one of the cable foundations,
    each of the at least two stay cables is guyed between the respective bracket and the respective cable foundation; and
    an angle ($\alpha$) between each stay cable and a tangent to an outer circumference of the wall at the respective bracket has, in a top view of the erected wind turbine, a value of 90°.

12. A method for assembling a wind turbine, comprising the steps of:
    a) providing a tower section, the tower section including at least two brackets attached to an outer surface of a tower section wall and at different locations on a circumference, the at least two brackets each comprising a single plate structure extending vertically between a first cross member and a second cross-member, the first cross member and the second cross-member being physically connected to the single plate structure and extending laterally from the single plate structure to adapt to a curvature of the tower section;
    b) connecting at least two stay cables to the at least two brackets, wherein an angle between each stay cable and a tangent to the circumference at the respective bracket has, in a top view of an erected wind turbine, a value of 90° when the respective stay cable is guyed; and
    c) lifting the tower section with the attached stay cables onto a further already erected tower section.

13. The method according to claim 12, including, before step a), the step of attaching the at least two brackets to the tower section at an erection site of the wind turbine.

14. The method according to claim 12, including, after step c), the step of connecting each of the at least two stay cables to a cable foundation.

15. The method according to claim 14, including the step of tensioning the at least two stay cables.

* * * * *